United States Patent
Decker

[15] 3,637,006
[45] Jan. 25, 1972

[54] PROPORTIONING CONTROL UNIT
[72] Inventor: Thomas K. Decker, Marietta, Ohio
[73] Assignee: Forma Scientific, Inc., Marietta, Ohio
[22] Filed: Apr. 8, 1970
[21] Appl. No.: 26,739

[52] U.S. Cl. .................................................165/26, 165/30
[51] Int. Cl. ............................................................F25b 29/00
[58] Field of Search ...............................................165/26, 36

[56] References Cited

UNITED STATES PATENTS 3,349,840  10/1967  Tope et al. ..............................165/26

Primary Examiner—Carroll B. Dority, Jr.
Attorney—Cushman, Darby & Cushman

[57] ABSTRACT

A control device for producing a first control variable or parameter substantially proportional to the duty cycle or ratio of "on" to "off" times of a second variable by heating a block of metal or other thermally conducting material during the "on" time of the second variable and utilizing the resultant block temperature or some other proportional variable as a control variable. In the preferred embodiment of this invention, the block temperature is used to establish the temperature and hence pressure of a closed body of fluid which pressure may be connected for use as a control variable. Several specific temperature regulation systems using such a control device in a refrigeration system are also enclosed.

19 Claims, 5 Drawing Figures

PATENTED JAN 25 1972
3,637,006
SHEET 1 OF 3
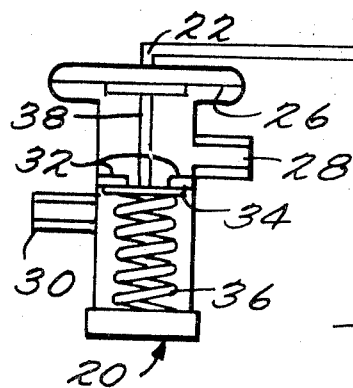
Fig. 1.
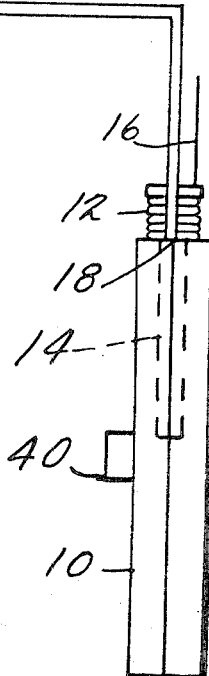
Fig. 2.
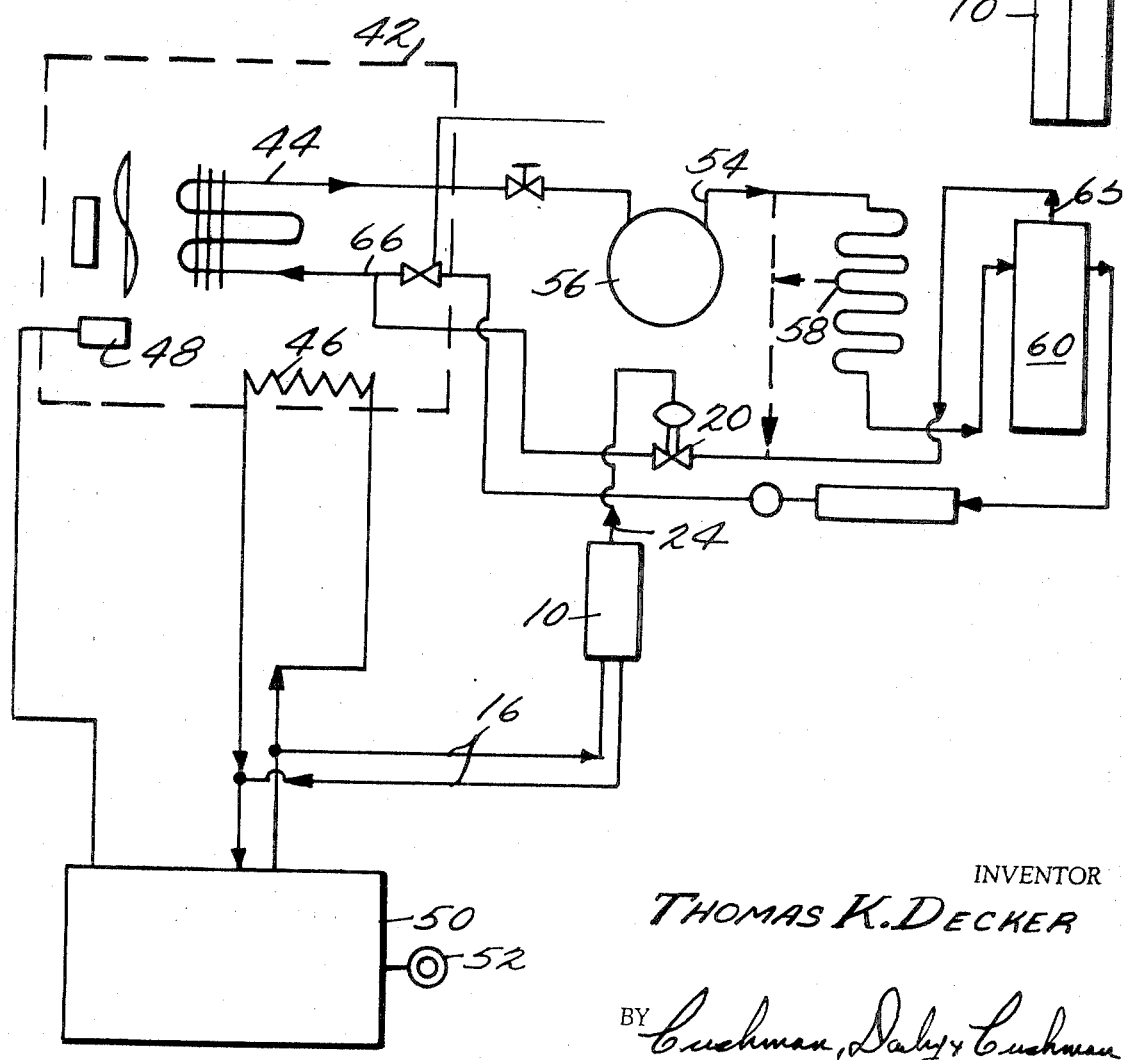
INVENTOR
THOMAS K. DECKER
BY Cushman, Darby & Cushman
ATTORNEYS

INVENTOR
THOMAS K. DECKER

PROPORTIONING CONTROL UNIT

Although potentially useful in a variety of circumstances, this invention generally relates to an apparatus for use in accurately controlling the temperature of an environmentally controlled chamber or other enclosure by the simultaneous controlled application of heat and refrigeration within the same enclosure. Briefly, in systems of this nature, more refrigeration and less heat are supplied to the enclosure if the existing temperature is too high while just the opposite, namely more heat and less refrigeration, are supplied when the existing temperature is too low.

Apparatus of this general description usually utilizes electromagnetic solenoid or motor driven control valves to inversely modulate the efficiency of refrigeration equipment with respect to a variable or modulated electrical current which is also used to directly or indirectly control the heating equipment and which is derived by comparing a set-point temperature with the actual temperature existing within the control chambers as sensed by an appropriate transducer.

Such an electromechanical apparatus has a relatively short life and requires frequent maintenance due to the many moving parts involved. In addition, such an apparatus may become inaccurate and/or noisy after prolonged operation.

Accordingly, it is an object of this invention to provide a proportional control unit having a minimum of moving mechanical parts for delivering a control variable substantially proportional to the duty cycle or a ratio of "on" to "off" time of an electric current by applying heat to a metal block during the "on" time of the electric current and utilizing the average temperature or some other variable proportionally related thereto as the control variable.

It is another object of this invention to provide a temperature regulation system utilizing such a proportional control unit for continuously modulating the efficiency or cooling capacity of a refrigeration system in response to the duty cycle or ration of "on" to "off" time of an electrical heater maintained within the same enclosure as the cooling coils of a refrigeration apparatus.

A further object of this invention is to provide a proportional valve control means wherein a control current is used to heat a block of metal to a temperature substantially proportional to the duty cycle or ratio of "on" to "off" time of the electric current, where a closed fluid system is at least partially maintained in thermal contract with the block and where the pressure within the closed fluid system is utilized to proportionally control a fluid valve means.

Another object of this invention is to provide a temperature regulation system wherein relatively warm vapor is bypassed to cooling coils within the refrigeration system thus maintaining the average temperature of the cooling coils higher than normal and resulting in less frost and less frequent defrosting periods.

The advantages of this invention over other possible temperature regulation systems and proportional controlling devices are many. For instance, in using this invention, no complicated null balance electrical drive system is needed. The thermal lag of the metal block effectively dampens the feedback system and prevents system oscillation often caused by the more rapid response of other proportional controlling devices. Also, since this invention utilizes a minimum of moving parts, the required maintenance level is likewise minimized. Then too, since the refrigeration compressor is running continuously rather than cycling on and off, the suction pressure of the compressor will be more stable and result in better lubrication and longer compressor life. There are no manual controls necessary to adjust the cooling capacity of the refrigeration system since such adjustments are all made automatically and cycling solenoid valves are eliminated, thus reducing noise and providing for a longer system life. These are but some of the advantages obtained by using this invention.

A more detailed and complete explanation of this invention may be obtained by carefully studying the following detailed description and the drawings, of which:

FIG. 1 is an illustration of one embodiment of the proportional control unit of this invention and a connected diaphragm valve;

FIG. 2 is a schematic diagram of a temperature regulation system with proportioning refrigeration control utilizing the proportional control unit and diaphragm valve of FIG. 1;

Figure 3:
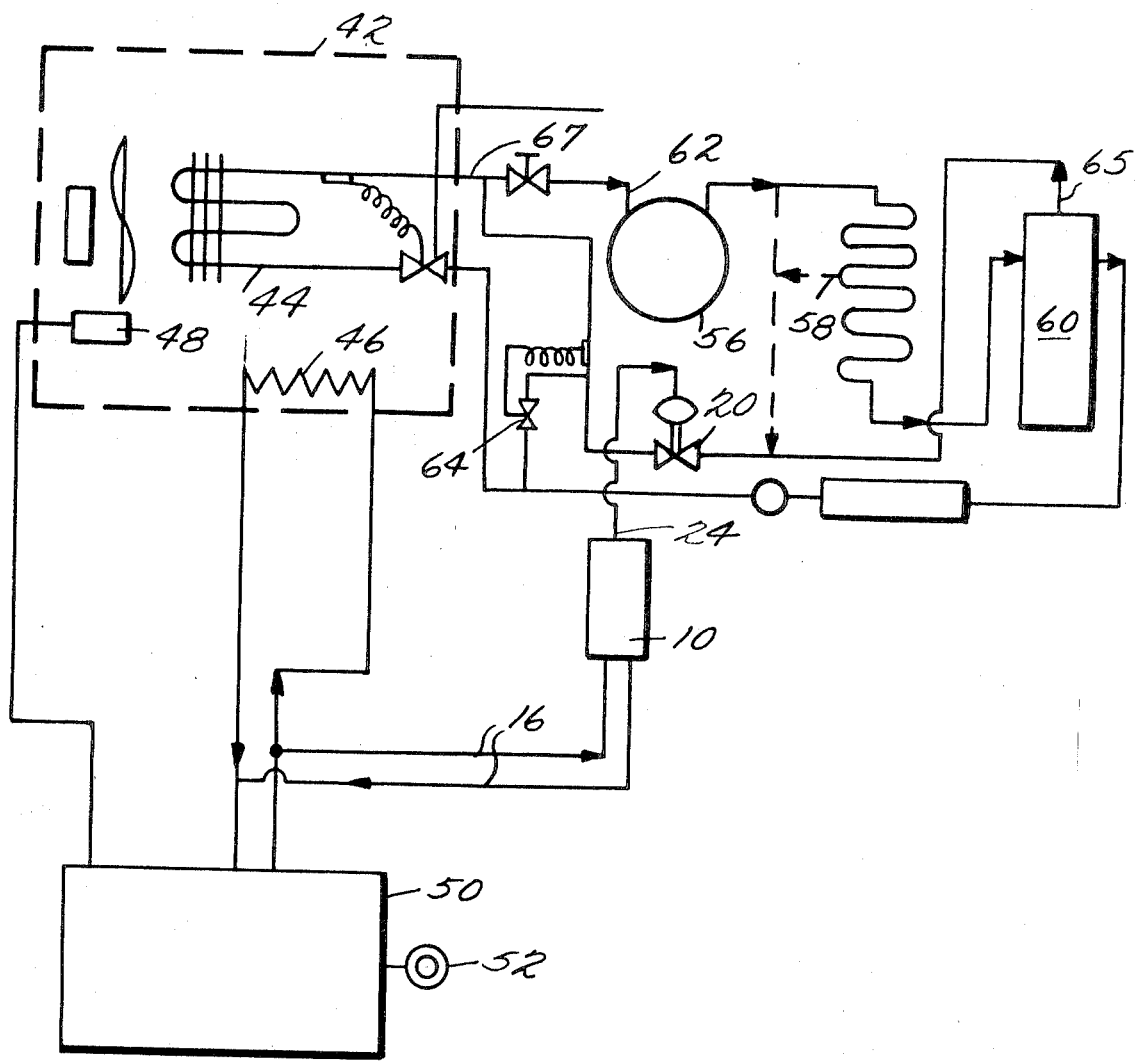
FIG. 3 is a schematic illustration of a temperature regulation system with proportioning refrigeration control having a slight modification from that shown in FIG. 2.

Referring to the right-hand portion of FIG. 1, an embodiment of the proportional control unit of this invention is shown. A metal block 10 or other thermally conductive material is utilized to both store and dissipate heat supplied thereto by an electrical heater 12 and to maintain fluid container 14 (which container may or may not be integrally formed with block 10) and any fluid contained therein at substantially the same temperature as metal block 10. Thus, block 10 acts to temporarily store energy in the form of heat from electrical heater 12 and to maintain the fluid in fluid container 14 at substantially the same temperature as the metal block 10.

Electrical heater input 16 to electrical heater 12 permits a predetermined electrical current to be supplied to a heater 12 during "on" time intervals, while there may be no current supplied during intervening "off" times. Assuming metal block 10 has a shape, mass and thermal characteristics to produce a requisite thermal lag between the instantaneous temperature of electrical heater 12 and the temperature of fluid in fluid container 14, the resulting fluid temperature will be substantially proportional to the duty cycle or ratio of "on" to "off" time of the electrical current supplied by electrical input line 16. If fluid container 14 is part of a close fluid system, then the fluid pressure at outlet 18 of fluid container 14 will be substantially proportional to the temperature of the fluid which is in turn substantially equal to the temperature of metal block 10 which is, in turn, substantially equal to the duty cycle of ratio of "on" to "off" time of electrical current supplied to electrical heater 12. Thus, a simple and proportional control unit with no moving parts except for the fluid within a closed fluid system has been provided for delivering a control variable, namely, fluid pressure, at outlet port 18, which is substantially proportional to the duty cycle of ratio of "on" to "off" time of another variable, namely, the electrical current supplied to electrical heater 12. It should also be understood, that if the electrical current is not "on" and "off," but rather continuously variable, then the control variable of pressure will be substantially proportional to the average of the electric current over a previous time interval.

FIG. 1 also reveals a diaphragm valve 20 with a fluid control inlet 22 connected to the outlet 18 of fluid container 14 by fluid containing means 24. A diaphragm 26 completes the closed fluid system. The valve 20 also has an inlet port 28 and an outlet port 30 with a valve seat 32 and movable valve member 34 interposed therebetween. Spring 36 normally biases valve 34 against valve seat 32, thus preventing the passage of any fluid from inlet port 28 to outlet port 30. However, when fluid in fluid container 14 is heated, due to electrical current supplied to electrical heater 12, the fluid pressure at outlet 18 increases and is transmitted via fluid containing means 24 to control inlet 22 of valve 20, where the increased fluid pressure depresses diaphragm 26, thus causing push rod 38 to mechanically move valve 34 away from valve seat 32, and thus permit passage of fluid (in the illustrative embodiments of this invention, the fluid will primarily comprise refrigerant in the vapor or gaseous state) from inlet port 28 to outlet port 30. With proper design, the passage of fluid from inlet port 28 to outlet port 30 of valve 20, may be made to be substantially proportional to the fluid pressure in line 24, and thus proportional to the duty cycle or the ratio of "on" to "off" time of electrical current supplied to heater 12 in metal block 10.

In the preferred embodiment of this invention, metal block 10 is formed from aluminum and the closed fluid system including fluid container 14 is filled with a liquid. Electrical heater 12 may be of the type having a nichrome heating element.

In addition to the other elements previously discussed, there may be provided a safety thermostat 40 in thermal contact with metal block 10 for sensing the temperatures of metal block 10, which are outside a normal operating range. For instance, if thermostat 40 detects a temperature in excess of a maximum, steps can then be taken automatically or manually to protect the fluid container 14 from overheating and resulting in damage to valve 20.

The heart of the temperature regulation system shown in FIG. 2 is the proportional control unit and valve means shown in FIG. 1. As shown in FIG. 2, a control chamber 42, as shown by dotted lines, is to have very accurate temperature control. Chamber 42 includes both cooling coils 44 and heating elements 46, as well as a temperature sensor 48. Sensor 48 and heating element 46 are connected to temperature control unit 50, as well as set-point means 52 for dialing in a desired temperature to be maintained in chamber 42. These elements cooperate in a usual way already well known in the art to turn heating element 46 "on" whenever the temperature sensed by sensor 48 is below the set-point temperature set by element 52, and by turning heating element 46 "off" whenever the temperature sensed by sensor 48 is higher than the set-point temperature.

The advantages of this invention are obtained by utilizing the on-off current supplied to heating element 46 to also heat metal block 10 by applying the current to electrical input lines 16, as previously described with respect to FIG. 1. The fluid control pressure is transmitted along the line 24 to diaphragm valve means 20, as previously described which is inserted within the refrigeration system and connected to cooling coils 44 in such a way as to reduce the efficiency or cooling capacity of the refrigeration system in response to an increased temperature of metal block 10 corresponding to an additional amount of heat being supplied to chamber 42 by heating element 46.

Bypassing hot gas from the compressor discharge to the cooling coil inlet or to the compressor inlet is a known technique of reducing the effective capacity of a cooling system. Such bypassing is usually accomplished with control valves which allow discrete changes in the system capacity. With such valves, the regulation is actually accomplished by using a fixed or adjustable spring pressure above a diaphragm and utilizing the variable evaporation pressure under the diaphragm for control thus limiting the minimum cooling coil temperature which is, in effect, capacity control.

Using this invention, a control liquid is utilized above the diaphragm thus eliminating completely the action of a variable pressure beneath the diaphragm and making the valve action dependent only upon the temperature of block 10.

In the embodiment shown in FIG. 2, an effective reduction in efficiency or capacity is achieved by effectively inserting valve means 20 between the high-pressure output port 54 of compressor and the input side of cooling coils 44. For example, valve 20 could be connected directly to port 54, to some point within condenser means 58 or at some point after condenser 58, such as liquid receiver 60.

It will be understood that only refrigerant vapor can be bypassed in large quantities since large amounts of liquid refrigerant could pass into the compressor and cause damage. Therefore, it is important that a proper point on the high side of the system be selected to obtain the necessary bypass vapors. Usually the vapors are taken from the compressor discharge 54 since the refrigerant is hottest at this point due to the combined heats of condensation and compression and the motor heat. However, it has been discovered that a point 58 on the condenser and a point 65 on top of liquid receiver 60 exists where vapor can be removed for bypass purposes after it has lost its heat by the reaction of the condenser thus allowing it to be fed directly back to the compressor without the use of a liquid injection expansion valve.

In general, with this invention, it is possible to bypass vapor from points 54, 58 or 65 through control valve 20 to point 66 at the input to the cooling coil 44. Thus, in FIG. 2 the right-hand input side of valve 20 is connected either as shown in the solid lines to the top of liquid receiver 60 at point 65 or, as shown by dotted lines, to the condenser at point 58 or directly to the compressor high-pressure outlet 54. The left-hand output side of regulated valve 20 is connected to the inlet 66 of cooling coil 44. Thus, when regulator valve 20 is proportionally opened in response to an increased temperature of metal block 10, a proportional and controlled amount of relatively warm vapor (from the point where the right-hand portion of regulator valve 20 is connected) is introduced to inlet 66 of cooling coil 44, thus reducing the effective cooling capacity of coil 44.

A modification of the system shown in FIG. 2 is shown in FIG. 3. The system shown in FIG. 3, is analogous to the system in FIG. 2, except that the relatively warm vapor proportionally controlled and flowing through regulator valve 20 is directly connected to point 67 on the low-pressure side 62 of compressor 56, rather than to the input side of coil 44. Thus, there is an effective short circuit between the high- and low-pressure sides of compressor 56, thereby reducing the efficiency of the refrigeration apparatus and hence the cooling capacity of coil 44. However to insure against overheating compressor 56, a thermostatically controlled liquid injection valve 64 is provided to also inject relatively cool liquid vapors at point 67 if needed to thus limit the temperature of compressor 56. Obviously, many combinations or permutations of the systems shown in FIG. 2 and FIG. 3 may be devised by one who is skilled in the art.

Figure 4:
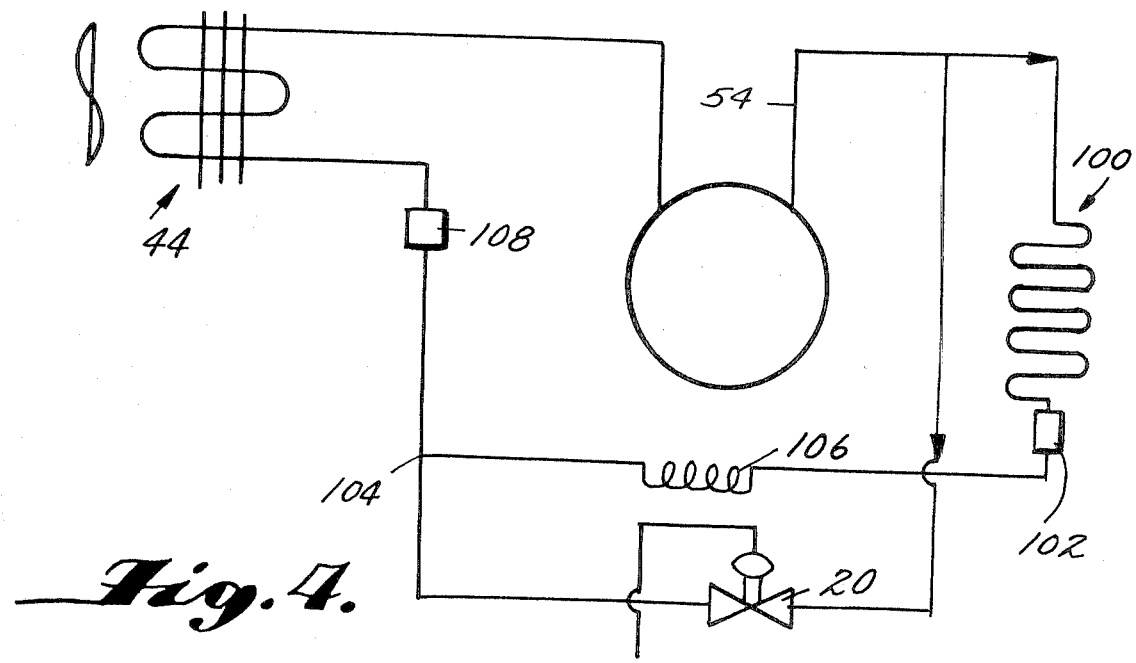
FIG. 4 is a schematic illustration of a proportional controlled refrigeration system according to this invention which uses a capillary tube rather than an expansion valve to meter cooling fluid to cooling coils.

Another embodiment of this invention is shown in FIG. 4 for use in a refrigeration system using a capillary tube 106 instead of a thermostatic expansion valve to meter cooled refrigerant liquid vapors to cooling coil 44. These systems do not use a liquid receiver but rather have only a condenser coil 100 and a filter-dryer 102 connected between the high-pressure port 54 of compressor 56 and the capillary 106. The effective system capacity is effectively controlled over an approximately 5–100 percent range by bypassing hot gas from port 54 through the regulated valve 20 (passing fluid in proportion to the temperature of block 10 as in the previous systems) to point 104 which is between capillary 106 and restrictor 108. Restriction 108 is sized to pass more refrigerant than the capillary 106 but to pass less than the regulating valve 20. Thus, when valve 20 is partially open, an intermediate pressure is created at point 104 which causes a reduced pressure drop across capillary 106 thereby reducing the refrigerant flow through the capillary 106. This reduced volume of cool refrigerant is mixed with hot gas from valve 20 before passing to the coil 44 thus reducing its efficiency or capacity. A range of approximately 5 to 100 percent is possible with this embodiment while yet maintaining a continuously running compressor and stable section pressures comparable to those possible with a more complicated system.

Figure 5:
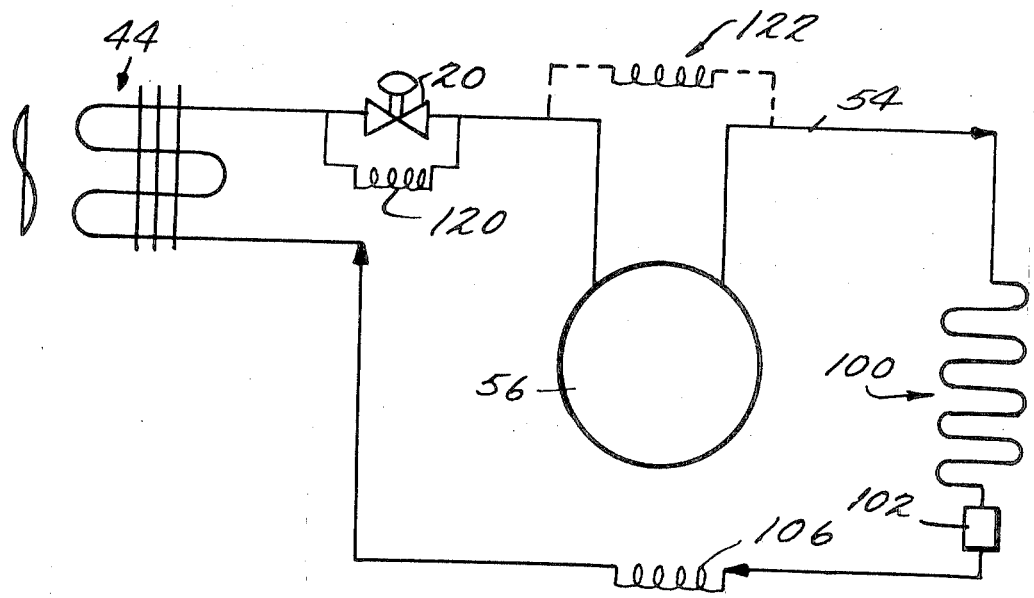
FIG. 5 is a schematic illustration of another embodiment of this invention in a system which is a modified version of that shown in FIG. 4.

The embodiment shown in FIG. 5 is a modification of that shown in FIG. 4 for use in a capillary controlled system. Here the control valve 20 is used to restrict the flow to the compressor 56 thus effecting a reduction in system capacity. Element 120 is a very small bleed across valve 20 which can also be placed across the compressor as shown in dotted lines by element 122. In any event bleed 122 or 120 equalizes the pressure across the compressor when the compressor is stopped thus allowing easier starting of the compressor after it has been stopped. Of course, with this system, valve 20 must be proportionately closed to reduce system capacity rather than opened as with the other embodiments. However, this result can be achieved by inversely controlling the valve 20. For instance, the current to the nichrome heater 12 in block 10 can be turned "on" when the room heater 46 is "off" and vice versa, thus making the temperature of the block proportioned to the ratio of "off" to "on" time of heater 46 but in any event still proportional to the duty cycle of the current actually supplied to the block heater 12. Other possibilities include constructing valve 20 to close rather than open upon an increase in control pressure. Obviously one skilled in the art could devise other ways to achieve the desired inverse control for this embodiment.

The system of FIG. 5 does not result in suction pressures which are stable as in the other embodiments; however, with reasonable care in selecting a compressor, a reliable long-life system can still be designed.

Thus, a temperature regulation system with proportioning refrigeration control has been disclosed wherein the flow of refrigerant in a refrigerating system is bypassed or the system refrigerant flow is restricted directly in proportion to the "on" time of a heating element disposed in a common environmentally controlled chamber thus proportionally reducing the cooling capacity of the system. The controller for the refrigerant bypass is buried within an aluminum (or other thermally conductive material) block which may be remotely located from the environmental chamber. As current is applied to the heater in the room, current is likewise applied to a heater in the aluminum block. This application of current raises the average temperature of a contained fluid system maintained in thermal contact within the aluminum block, and thereby proportionally increases the pressure of the fluid which is connected to a pressure controlled valve controlling the bypass or flow restriction of a refrigerant in a refrigeration system. Thus, as the temperature rises in the aluminum block, the amount of refrigerant bypassed or restricted is increased proportionally thus proportionally reducing the cooling capacity of the cooling system when the environmentally controlled chamber is in need of added heating. Such a system has particular advantages, wherein an accurate temperature control is desired, such as in bacteriological incubators, constant temperature baths or any other kind of environmentally controlled enclosures requiring refrigeration. Since the aluminum block size is selected to have sufficient mass to heat and cool at a relatively slow rate, the ratio of "on" to "off" cycling of the chamber heaters will determine the average aluminum block temperature. Hence, at higher temperatures the chamber heaters would be "on" for longer periods of time and the cooling capacity of the cooling coil would be reduced proportionally. At lower chamber temperatures, the heaters would be "on" for shorter periods of time and the cooling capacity of the cooling coil would be increased proportionally. The overall effect is complete automatic continuous control over the capacity of the cooling coil in the environmentally controlled chamber.

Although only a few embodiments of this invention have been particularly described, it will be apparent to those skilled in the art that many useful modifications could be made within the scope of this invention. For instance, if inverse proportional control were desired, one could arrange to apply heat to the metal block during the "off" times, rather than "on" times of a variable. Other modifications are equally apparent to one skilled in the art and need not be described here in further detail.

What is claimed is:

1. A temperature regulation system with proportioning refrigeration control for an environmentally controlled chamber, said system comprising:

electrical heater means for supplying heat to said chamber,
   an on-off temperature control for switching said electrical heater means on and off in response to a comparison of a sensed temperature existing in said chamber and a predetermined set-point temperature,
   a continuous running refrigeration means for removing heat from said chamber,
   regulating means for producing a controlled reduction in the efficiency or rate of heat removal by said refrigeration means, and
   proportioning control means for controlling said regulating means and causing said controlled reduction to be substantially proportional to the duty cycle or ratio of on to off time of said electrical heater means.

2. A system as in claim 1, wherein said proportioning control means includes:
   a block of thermally conducting material,
   a second electrical heater means for supplying heat to said block whenever said first mentioned electrical heater means is supplying heat to said chamber,
   a fluid chamber means for containing a control fluid in thermal contact with said block, and
   control outlet means connected to said fluid chamber means for delivering a control fluid pressure to said regulating means which is substantially proportional to the temperature of said block.

3. A system as in claim 1, wherein said refrigeration means includes:
   a compressor having a low- and a high-pressure port for compressing a cooling fluid,
   cooling coils disposed substantially within said chamber, and wherein
   said regulating means includes valve means for operative connection to said proportioning control means, said valve means also being operatively connected for bypassing a controlled amount of relatively warm cooling fluid from said high-pressure port to said cooling coils.

4. A system as in claim 3, wherein said proportioning control means includes:
   a block of thermally conducting material,
   a second electrical heater means for supplying heat to said block whenever said first mentioned electrical heater means is supplying heat to said chamber,
   a fluid chamber means for containing a control fluid in thermal contact with said block, and
   control outlet means connected to said fluid chamber means for delivering a control fluid pressure to said regulating means which is substantially proportional to the temperature of said block.

5. A system as in claim 1, wherein said refrigeration means includes:
   a compressor having a low- and high-pressure port for compressing a cooling fluid,
   cooling coils disposed substantially within said chamber, and wherein
   said regulating means includes valve means for connection to said proportioning control means, said valve means also being operatively connected for bypassing a controlled amount of relatively warm cooling fluid from fluid containing means operatively connected with said high-pressure port to said cooling coils.

6. A system as in claim 5, wherein said proportioning control means includes:
   a block of thermally conducting material,
   a second electrical heater means for supplying heat to said block whenever said first mentioned electrical heater means is supplying heat to said chamber,
   a fluid chamber means for containing a central fluid in thermal contact with said block, and
   control outlet means connected to said fluid chamber means for delivering a control fluid pressure to said regulation means which is substantially proportional to the temperature of said block.

7. A system as in claim 1, wherein said refrigeration means includes:
   a compressor having a low- and a high-pressure port for compressing a cooling fluid,
   cooling coils disposed substantially within said chamber, and wherein
   said regulation means includes valve means for connection to said proportioning control means, said valve means also being operatively connected for bypassing a controlled amount of relatively warm cooling fluid from said high-pressure port to said low-pressure port.

8. A system as in claim 7, wherein said proportioning control means includes:
 a block of thermally conducting material,
 a second electrical heater means for supplying heat to said block whenever said first mentioned electrical heater means is supplying heat to said chamber,
 a fluid chamber means for containing a control fluid in thermal contact with said block, and
 control outlet means connected to said fluid chamber means for delivering a control fluid pressure to said regulation means which is substantially proportional to the temperature of said block.

9. A system as in claim 1, wherein said refrigeration means includes:
 a compressor having a low- and high-pressure port for compressing a cooling fluid,
 cooling coils disposed substantially within said chamber, and wherein
 said regulation means includes valve means for connection to said proportioning control means, said valve means also being operatively connected for bypassing a controlled amount of relatively warm cooling fluid from fluid containing means effectively connected with said high-pressure port to fluid containing means effectively connected with said low-pressure port.

10. A system as in claim 9, wherein said proportioning control means includes:
 a block of thermally conducting material,
 a second electrical heater means for supplying heat to said block whenever said first mentioned electrical heater means is supplying heat to said chamber,
 a fluid chamber means for containing a control fluid in thermal contact with said block, and
 control outlet means connected to said fluid chamber means for delivering a control fluid pressure to said regulation means which is substantially proportional to the temperature of said block.

11. A system as in claim 1, wherein said refrigeration means includes:
 a compressor having a low- and a high-pressure port for compressing a cooling fluid,
 cooling coils disposed substantially within said chamber, and wherein
 said regulation means includes valve means for connection to said proportioning control means, said valve means also being operatively connected for bypassing a controlled amount of relatively warm cooling fluid from said high-pressure port to fluid containing means effectively connected with said low-pressure port.

12. A system as in claim 11 wherein said proportioning control means includes:
 a block of thermally conducting material,
 a second electrical heater means for supplying heat to said block whenever said first mentioned electrical heater means is supplying heat to said chamber,
 a fluid chamber means for containing a control fluid in thermal contact with said block, and
 control outlet means connected to said fluid chamber means for delivering a control fluid pressure to said regulation means which is substantially proportional to the temperature of said block.

13. A system as in claim 1, wherein said refrigeration means includes:
 a compressor having a low- and a high-pressure port for compressing a cooling fluid,
 cooling coils disposed substantially within said chamber, and wherein
 said regulation means includes valve means for connection to said proportioning control means, said valve means also being operatively connected for bypassing a controlled amount of relatively warm cooling fluid from fluid containing means effectively connected with said high-pressure port to said low-pressure port.

14. A system as in claim 13, wherein said proportioning control means includes:
 a block of thermally conducting material,
 a second electrical heater means for supplying heat to said block whenever said first mentioned electrical heater means is supplying heat to said chamber,
 a fluid chamber means for containing a control fluid in thermal contact with said block, and
 control outlet means connected to said fluid chamber means for delivering a control fluid pressure to said regulation means which is substantially proportional to the temperature of said block.

15. A system as in claim 1 wherein said refrigeration means includes:
 a compressor having a low- and a high-pressure side for compressing a cooling fluid,
 cooling coils disposed substantially within said chamber, and operatively connected to said low-pressure side of said compressor,
 condensing coils connected to said high-pressure side of said compressor,
 a flow restriction means connected to said cooling coils,
 capillary means operatively connected between said condensing coils and said flow restriction means for metering said cooling fluid therebetween,
 said regulating means includes valve means for operative connection to said proportioning control means, said valve means also being operatively connected for bypassing a controlled amount of relatively warm cooling fluid from said high-pressure side to a point between said capillary means and said flow restricting device for introducing said warm fluid into said cooling coils through said flow restricting means and for reducing the flow of cooling fluid through said capillary means.

16. A system as in claim 15 wherein said proportioning control means includes:
 a block of thermally conducting material,
 a second electrical heater means for supplying heat to said block whenever said first mentioned electrical heater means is applying heat to said chamber,
 a fluid chamber means for containing a control fluid in thermal contact with said block, and
 control outlet means connected to said fluid chamber means for delivering a control pressure to said regulating means which is substantially proportional to the temperature of said block.

17. A system as in claim 1 wherein said refrigeration means includes:
 a compressor having a low- and a high-pressure side for compressing a cooling fluid,
 cooling coils disposed substantially within said chamber and operatively coupled to said low-pressure side of said compressor,
 condensing coils connected to said high-pressure side of said compressor,
 capillary means operatively connected to said condensing coils and to said cooling coils for metering said cooling fluid therebetween, and wherein
 said regulating means includes valve means for operative connection to said proportioning control means, said valve means also being operatively connected in the system to effectively restrict the flow of said cooling fluid through said cooling coils thereby reducing the cooling capacity of the system.

18. A system as in claim 17 wherein said proportioning control means includes:
 a block of thermally conducting material,
 a second electrical heater means for supplying heat to said block whenever said first-mentioned electrical heater means is not supplying heat to said chamber, a fluid chamber means for containing a control fluid in thermal contact with said block, and control outlet means connected to said fluid chamber means for delivering a control pressure to said regulating means which is substantially proportional to the temperature of said blocks, and wherein said valve means is operative to proportionally open upon an increase in said control pressure and to proportionally close upon a decrease in said control pressure.

19. A system as in claim 17 wherein said proportioning control means includes:

a block of thermally conducting material, a second electrical heater means for supplying heat to said block whenever said first-mentioned electrical heater means is supplying heat to said chamber, a fluid chamber means for containing a control fluid in thermal contact with said block, and control outlet means connected to said fluid chamber means for delivering a control pressure to said regulating means which is substantially proportional to the temperature of said block, and wherein, said valve means is operative to proportionally close upon an increase in said control pressure and to proportionally open upon a decrease in said control pressure.

* * * * *